US012254746B2

(12) United States Patent
Shepherd et al.

(10) Patent No.: US 12,254,746 B2
(45) Date of Patent: Mar. 18, 2025

(54) FUNDING A PROGRESSIVE WITH MARKETING DOLLARS

(71) Applicant: IGT, Las Vegas, NV (US)

(72) Inventors: Jeffery Shepherd, Reno, NV (US); Kevin Higgins, Reno, NV (US)

(73) Assignee: IGT, Las Vegas, NV (US)

( * ) Notice: Subject to any disclaimer, the term of this patent is extended or adjusted under 35 U.S.C. 154(b) by 217 days.

(21) Appl. No.: 17/835,207

(22) Filed: Jun. 8, 2022

(65) Prior Publication Data

US 2023/0401929 A1 Dec. 14, 2023

(51) Int. Cl.
*G07F 17/32* (2006.01)

(52) U.S. Cl.
CPC ...... *G07F 17/3258* (2013.01); *G07F 17/3255* (2013.01); *G07F 17/3267* (2013.01)

(58) Field of Classification Search
CPC ........................................................ G07F 17/32
See application file for complete search history.

(56) References Cited

U.S. PATENT DOCUMENTS

| | | | | |
|---|---|---|---|---|
| 7,883,410 | B2 * | 2/2011 | Soukup | G07F 17/32 463/25 |
| 7,931,531 | B2 * | 4/2011 | Oberberger | G07F 17/32 463/6 |
| 10,325,450 | B2 | 6/2019 | Hallerbach et al. | |
| 2003/0027635 | A1 * | 2/2003 | Walker | G06Q 10/02 463/40 |
| 2014/0256412 | A1 * | 9/2014 | Colvin | G07F 17/3267 463/25 |
| 2018/0082533 | A1 * | 3/2018 | Hallerbach | G07F 17/3258 |

* cited by examiner

*Primary Examiner* — Omkar A Deodhar
(74) *Attorney, Agent, or Firm* — Sage Patent Group

(57) ABSTRACT

An electronic gaming machine ("EGM") includes a processor circuit and a memory coupled to the processor circuit. The memory includes machine-readable instructions that, when executed by the processor circuit, cause the EGM to perform operations. The operations include determining a user has earned a comp. The operations further include increasing a progressive award based on the comp. The operations further include outputting an indicator of the progressive award.

20 Claims, 6 Drawing Sheets

FUNDING A PROGRESSIVE WITH MARKETING DOLLARS

BACKGROUND

Embodiments described herein relate to electronic gaming machines (EGMs), and in particular to modifying operation of a game provided by EGMs, and related systems, devices, and methods. In some examples, a progressive award (e.g., a jackpot) is available to a player of an EGM. A value of the progressive award can be increased by portion of each wager made on the EGM. In additional or alternative examples, EGMs in a gaming environment, such as a casino environment, may have a linked (or shared) progressive award that is increased by a portion of each wager made on one of the qualifying EGMs. Once a user triggers a gameplay event on one of the qualifying EGMs, the progressive award can be provided to the user and the progressive award can be reduced to a predetermined amount (e.g., zero).

SUMMARY

According to some embodiments, an electronic gaming machine ("EGM") includes a processor circuit and a memory coupled to the processor circuit. The memory includes machine-readable instructions that, when executed by the processor circuit, cause the EGM to perform operations. The operations include determining a user has earned a comp. The operations further include increasing a progressive award based on the comp. The operations further include outputting an indicator of the progressive award.

According to other embodiments, a method of operating a progressive controller is provided. The method includes determining a first person has earned a comp. The method further includes, responsive to determining that the first person has earned the comp, increasing a progressive award based on the comp. The method further includes determining a triggering event has occurred based on an increase to the progressive award or gameplay activity by a second person. The method further includes, responsive to determining the triggering event has occurred, providing the progressive award to the second person.

According to other embodiments, a system includes a processor circuit and a memory coupled to the processor circuit. The memory includes machine-readable instructions that, when executed by the processor circuit, cause the processor circuit to perform operations. The operations include determining a person has earned a comp. The operations further include increasing a progressive award based on the comp. The operations further include, responsive to increasing the progressive award, transmitting a message to one or more devices indicating the progressive award.

DETAILED DESCRIPTION

Progressive awards can attract players by offering the opportunity for a bigger than normal prize. However, progressive awards may only attract wagering players to a gaming environment and can be limited to a monetary prize pool that directly cuts into the profitability of EGMs. Thus, there is a need to attract a wider range of players and to provide operators with more control over the source of the progressive award.

Embodiments described herein relate to funding progressive awards with marketing dollars based on earned comps. In some embodiments, the progressive awards are funded based on comps earned by players through non-wagering activities. Players can also win these progressive awards via non-wagering activities, which can allow operators of progressive awards to attract a wider range of players. In additional or alternative embodiments, the progressive awards are funded based on comps that are sourced from a marketing budget. In some examples, reducing the cut taken from wagers that goes to a progressive award can reduce the impact of progressive awards on profits.

Figure 1:
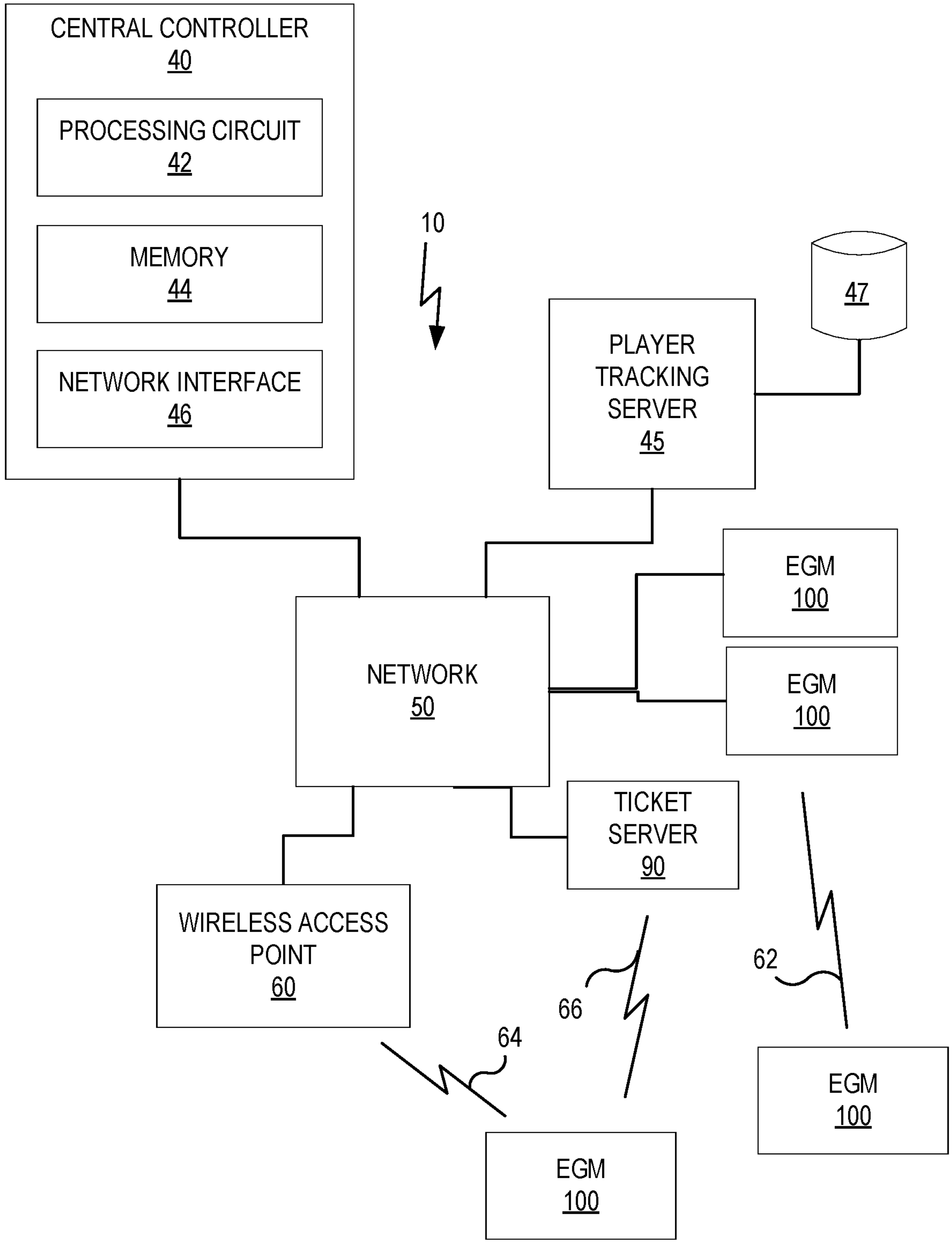
FIG. 1 is a schematic block diagram illustrating an example of a network configuration for a plurality of gaming devices according to some embodiments.

Before describing these and other embodiments in detail, reference is made to FIG. 1, which illustrates a gaming system 10 including a plurality of gaming devices 100. As discussed above, the gaming devices 100 may be one type of a variety of different types of gaming devices, such as electronic gaming machines (EGMs), mobile devices, or other devices, for example. The gaming system 10 may be located, for example, on the premises of a gaming establishment, such as a casino. The gaming devices 100, which are typically situated on a casino floor, may be in communication with each other and/or at least one central controller 40 through a data communication network 50 that may include a remote communication link. The data communication network 50 may be a private data communication network that is operated, for example, by the gaming facility that operates the gaming devices 100. Communications over the data communication network 50 may be encrypted for security. The central controller 40 may be any suitable server or computing device which includes at least one processor circuit and at least one memory or storage device. Each gaming device 100 may include a processor circuit that transmits and receives events, messages, commands or any other suitable data or signal between the gaming device 100 and the central controller 40. The gaming device processor circuit is operable to execute such communicated events, messages or commands in conjunction with the operation of the gaming device 100. Moreover, the processor circuit of the central controller 40 is configured to transmit and receive events, messages, commands or any other suitable data or signal between the central controller 40 and each of the individual gaming devices 100. In some embodiments, one or more of the functions of the central controller 40 may be performed by one or more gaming device processor circuits. Moreover, in some embodiments, one or more of the functions of one or more gaming device processor circuits as disclosed herein may be performed by the central controller 40.

A wireless access point 60 provides wireless access to the data communication network 50. The wireless access point 60 may be connected to the data communication network 50 as illustrated in FIG. 1, and/or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the gaming system 10 may include a ticket server 90 that is configured to print and/or dispense wagering tickets. The ticket server 90 may be in communication with the central controller 40 through the data communication network 50. Each ticket server 90 may include a processor circuit that transmits and receives events, messages, commands or any other suitable data or signal between the ticket server 90 and the central controller 40. The ticket server 90 processor circuit may be operable to execute such communicated events, messages or commands in conjunction with the operation of the ticket server 90. Moreover, in some embodiments, one or more of the functions of one or more ticket server 90 processor circuits as disclosed herein may be performed by the central controller 40.

The gaming devices 100 communicate with one or more elements of the gaming system 10 to coordinate providing wagering games and other functionality. For example, in some embodiments, the gaming device 100 may communicate directly with the ticket server 90 over a wireless interface 62, which may be a WiFi link, a Bluetooth link, an NFC link, etc. In other embodiments, the gaming device 100 may communicate with the data communication network 50 (and devices connected thereto, including other gaming devices 100) over a wireless interface 64 with the wireless access point 60. The wireless interface 64 may include a WiFi link, a Bluetooth link, an NFC link, etc. In still further embodiments, the gaming devices 100 may communicate simultaneously with both the ticket server 90 over the wireless interface 66 and the wireless access point 60 over the wireless interface 64. Some embodiments provide that gaming devices 100 may communicate with other gaming devices over a wireless interface 64. In these embodiments, wireless interface 62, wireless interface 64 and wireless interface 66 may use different communication protocols and/or different communication resources, such as different frequencies, time slots, spreading codes, etc.

Figure 2A:
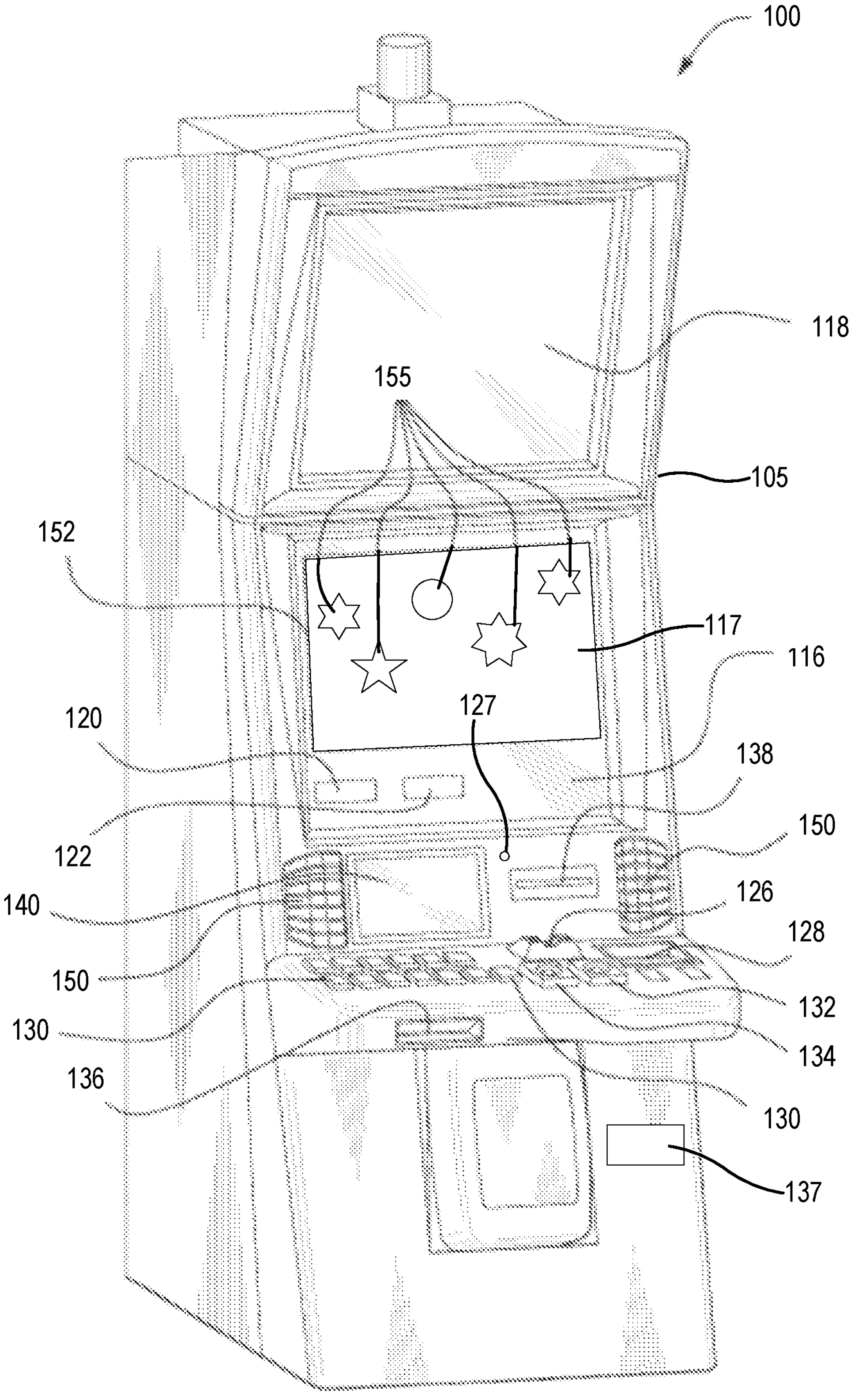
FIGS. 2A-E are diagrams illustrating examples of gaming devices according to various embodiments.
Figure 2B:
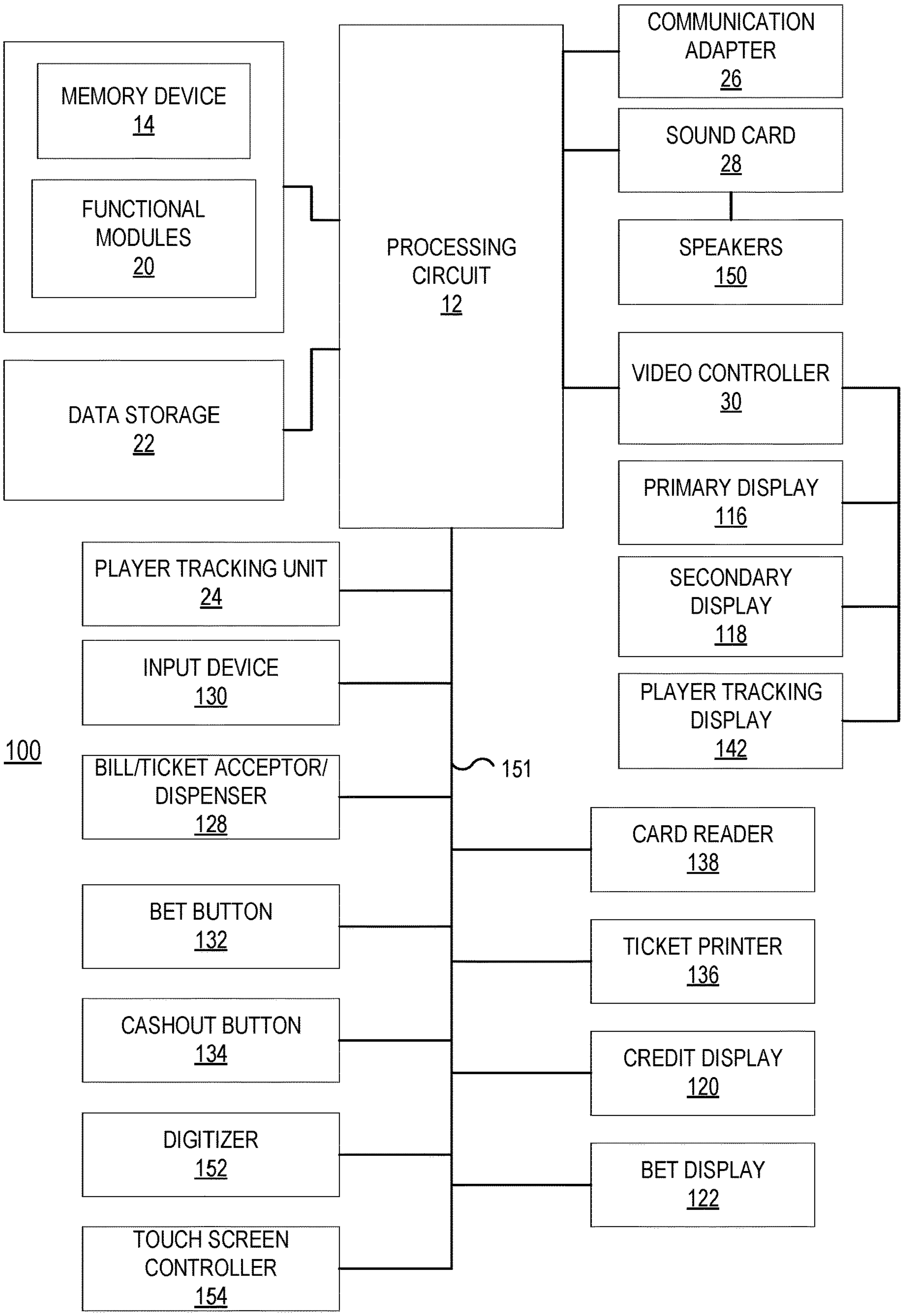
Figure 2C:
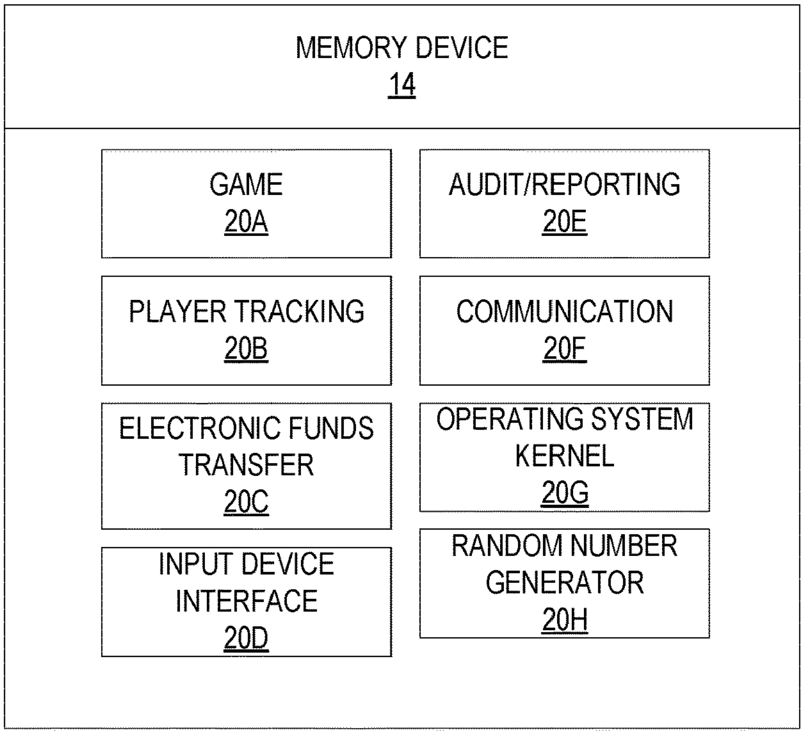

Embodiments herein may include different types of gaming devices. Various embodiments are illustrated in FIGS. 2A, 2B, and 2C in which FIG. 2A is a perspective view of a gaming device 100 illustrating various physical features of the device, FIG. 2B is a functional block diagram that schematically illustrates an electronic relationship of various elements of the gaming device 100, and FIG. 2C illustrates various functional modules that can be stored in a memory device of the gaming device 100. The embodiments shown in FIGS. 2A-C are provided as examples for illustrative purposes only. It will be appreciated that gaming devices may come in many different shapes, sizes, layouts, form factors, and configurations, and with varying numbers and types of input and output devices, and that embodiments of the inventive concepts are not limited to the particular gaming device structures described herein.

Gaming devices 100 typically include a number of standard features, many of which are illustrated in FIGS. 2A-B. For example, referring to FIG. 2A, a gaming device 100 may include a support structure, housing 105 (e.g., cabinet) which provides support for a plurality of displays, inputs, outputs, controls and other features that enable a player to interact with the gaming device 100.

The gaming device 100 illustrated in FIG. 2A includes a number of display devices, including a primary display device 116 located in a central portion of the housing 105 and a secondary display device 118 located in an upper portion of the housing 105. A plurality of game components 155 are displayed on a display screen 117 of the primary display device 116. It will be appreciated that one or more of the display devices 116, 118 may be omitted, or that the display devices 116, 118 may be combined into a single display device. The gaming device 100 may further include a player tracking display 142, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the gaming device 100.

The player tracking display 142 may be used to display a service window that allows the player to interact with, for example, their player loyalty account to obtain features, bonuses, comps, etc. In other embodiments, additional display screens may be provided beyond those illustrated in FIG. 2A. In some embodiments, one or more of the player tracking display 142, the credit display 120 and the bet display 122 may be displayed in one or more portions of one or more other displays that display other game related visual content. For example, one or more of the player tracking display 142, the credit display 120 and the bet display 122 may be displayed in a picture in a picture on one or more displays.

The gaming device 100 may further include a number of input devices 130 that allow a player to provide various inputs to the gaming device 100, either before, during or after a game has been played. The gaming device may further include a game play initiation button 132 and a cashout button 134. The cashout button 134 is utilized to receive a cash payment or any other suitable form of payment corresponding to a quantity of remaining credits of a credit display.

In some embodiments, one or more input devices of the gaming device 100 are one or more game play activation devices that are each used to initiate a play of a game on the gaming device 100 or a sequence of events associated with the gaming device 100 following appropriate funding of the gaming device 100. The example gaming device 100 illustrated in FIGS. 2A and 2B includes a game play activation device in the form of a game play initiation button 132. It should be appreciated that, in other embodiments, the gaming device 100 begins game play automatically upon appropriate funding rather than upon utilization of the game play activation device.

In some embodiments, one or more input device 130 of the gaming device 100 may include wagering or betting functionality. For example, a maximum wagering or betting function may be provided that, when utilized, causes a maximum wager to be placed. Another such wagering or betting function is a repeat the bet device that, when utilized, causes the previously placed wager to be placed. A further such wagering or betting function is a bet one function. A bet is placed upon utilization of the bet one function. The bet is increased by one credit each time the bet one device is utilized. Upon the utilization of the bet one function, a quantity of credits shown in a credit display (as described below) decreases by one, and a number of credits shown in a bet display (as described below) increases by one.

In some embodiments, as shown in FIG. 2B, the input device(s) 130 may include and/or interact with additional components, such as a touch-sensitive display that includes a digitizer 152 and a touchscreen controller 154 for touch input devices, as disclosed herein. The player may interact with the gaming device 100 by touching virtual buttons on one or more of the display devices 116, 118, 140. Accordingly, any of the above-described input devices, such as the input device 130, the game play initiation button 132 and/or the cashout button 134 may be provided as virtual buttons or regions on one or more of the display devices 116, 118, 140.

Referring briefly to FIG. 2B, operation of the primary display device 116, the secondary display device 118 and the player tracking display 142 may be controlled by a video controller 30 that receives video data from a processor circuit 12 or directly from a memory device 14 and displays the video data on the display screen. The credit display 120 and the bet display 122 are typically implemented as simple LCD or LED displays that display a number of credits available for wagering and a number of credits being wagered on a particular game. Accordingly, the credit display 120 and the bet display 122 may be driven directly by the processor circuit 12. In some embodiments however, the credit display 120 and/or the bet display 122 may be driven by the video controller 30. The gaming device 100 may also include a player tracking unit 24 for managing communications and functionality between the processor circuit 12 and certain peripherals and components. Player tracking units 24 may be standardized across machine types to operate interchangeably across a manufacturer's lineup.

Referring again to FIG. 2A, the display devices 116, 118, 140 may include, without limitation: a cathode ray tube, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touchscreen with an associated touchscreen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the gaming device 100 are generally configured to display one or more game and/or non-game images, symbols, and indicia. In certain embodiments, the display devices 116, 118, 140 of the gaming device 100 are configured to display any suitable visual representation or exhibition of the movement of objects; dynamic lighting; video images; images of people, characters, places, things, and faces of cards; and the like. In certain embodiments, the display devices 116, 118, 140 of the gaming device 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The gaming device 100 also includes various features that enable a player to deposit credits in the gaming device 100 and withdraw credits from the gaming device 100, such as in the form of a payout of winnings, credits, etc. For example, the gaming device 100 may include a bill/ticket printer 136, a bill/ticket acceptor/dispenser 128, that allows the player to deposit and/or receive tickets and/or currency into the gaming device 100.

As illustrated in FIG. 2A, the gaming device 100 may also include a currency dispenser 137 that may include a note dispenser configured to dispense paper currency and/or a coin generator configured to dispense coins or tokens in a coin payout tray.

The gaming device 100 may further include one or more speakers 150 controlled by one or more sound cards 28 (FIG. 2B). The gaming device 100 illustrated in FIG. 2A includes a pair of speakers 150. In other embodiments, additional speakers, such as surround sound speakers, may be provided within or on the housing 105. Moreover, the gaming device 100 may include built-in seating with integrated headrest speakers.

In various embodiments, the gaming device 100 may generate dynamic sounds coupled with attractive multimedia images displayed on one or more of the display devices 116, 118, 140 to provide an audio-visual representation or to otherwise display full-motion video with sound to attract players to the gaming device 100 and/or to engage the player during gameplay. In certain embodiments, the gaming device 100 may display a sequence of audio and/or visual attraction messages during idle periods to attract potential players to the gaming device 100. The videos may be customized to provide any appropriate information.

The gaming device 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processor circuit determines the amount of funds entered and displays the corresponding amount on the credit or other suitable display as described above.

In some embodiments, the gaming device 100 may include an electronic payout device or module configured to fund an electronically recordable identification card or smart card or a bank or other account via an electronic funds transfer to or from the gaming device 100.

FIG. 2B is a block diagram that illustrates logical and functional relationships between various components of a gaming device 100. It should also be understood that components described in FIG. 2B may also be used in other computing devices, as desired, such as mobile computing devices for example. As shown in FIG. 2B, the gaming device 100 may include a processor circuit 12 that controls operations of the gaming device 100. Although illustrated as a single processor circuit, multiple special purpose and/or general-purpose processors and/or processor cores may be provided in the gaming device 100. For example, the gaming device 100 may include one or more of a video processor, a signal processor, a sound processor and/or a communication controller that performs one or more control functions within the gaming device 100. The processor circuit 12 may be variously referred to as a "controller," "microcontroller," "microprocessor" or simply a "computer." The processor may further include one or more application-specific integrated circuits (ASICs).

Various components of the gaming device 100 are illustrated in FIG. 2B as being connected to the processor circuit 12. It will be appreciated that the components may be connected to the processor circuit 12 through a system bus 151, a communication bus and controller, such as a USB controller and USB bus, a network interface, or any other suitable type of connection.

The gaming device 100 further includes a memory device 14 that stores one or more functional modules 20. Various functional modules 20 of the gaming device 100 will be described in more detail below in connection with FIG. 2D.

The memory device 14 may store program code and instructions, executable by the processor circuit 12, to control the gaming device 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EE PROM (electrically erasable programmable read only memory). Any other suitable magnetic, optical and/or semiconductor memory may operate in conjunction with the gaming device disclosed herein.

The gaming device 100 may further include a data storage 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, DVD or USB memory device.

The gaming device 100 may include a communication adapter 26 that enables the gaming device 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or near field communications (NFC) that enable the gaming device 100 to communicate, for example, with a mobile communication device operated by a player.

The gaming device 100 may include one or more internal or external communication ports that enable the processor circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumb drives, ticket readers, touch screens, trackballs, touchpads, wheels, and wireless communication devices. In some embodiments, internal or external peripheral devices may communicate with the processor circuit through a universal serial bus (USB) hub (not shown) connected to the processor circuit 12.

In some embodiments, the gaming device 100 may include a sensor, such as a camera 127, in communication with the processor circuit 12 (and possibly controlled by the processor circuit 12) that is selectively positioned to acquire an image of a player actively using the gaming device 100 and/or the surrounding area of the gaming device 100. In one embodiment, the camera 127 may be configured to selectively acquire still or moving (e.g., video) images and may be configured to acquire the images in either an analog, digital or other suitable format. The display devices 116, 118, 140 may be configured to display the image acquired by the camera 127 as well as display the visible manifestation of the game in split screen or picture-in-picture fashion. For example, the camera 127 may acquire an image of the player and the processor circuit 12 may incorporate that image into the primary and/or secondary game as a game image, symbol or indicia.

Various functional modules of that may be stored in a memory device 14 of a gaming device 100 are illustrated in FIG. 2C. Referring to FIG. 2C, the gaming device 100 may include in the memory device 14 a game module 20A that includes program instructions and/or data for operating a hybrid wagering game as described herein. The gaming device 100 may further include a player tracking module 20B, an electronic funds transfer module 20C, an input device interface 20D, an audit/reporting module 20E, a communication module 20F, an operating system kernel 20G and a random number generator 20H. The player tracking module 20B keeps track of the play of a player. The electronic funds transfer module 20C communicates with a back-end server or financial institution to transfer funds to and from an account associated with the player. The input device interface 20D interacts with input devices, such as the input device 130, as described in more detail below. The communication module 20F enables the gaming device 100 to communicate with remote servers and other gaming devices using various secure communication interfaces. The operating system kernel 20G controls the overall operation of the gaming device 100, including the loading and operation of other modules. The random number generator 20H generates random or pseudorandom numbers for use in the operation of the hybrid games described herein.

Many embodiments described herein employ gaming devices 100 that are land-based EGMs, such as banks of slot machines in a casino environment, but in some embodiments, a gaming device 100 may additionally or alternatively include a personal device, such as a desktop computer, a laptop computer, a mobile device, a tablet computer or computing device, a personal digital assistant (PDA), or other portable computing devices. In some embodiments, the gaming device 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 2D:
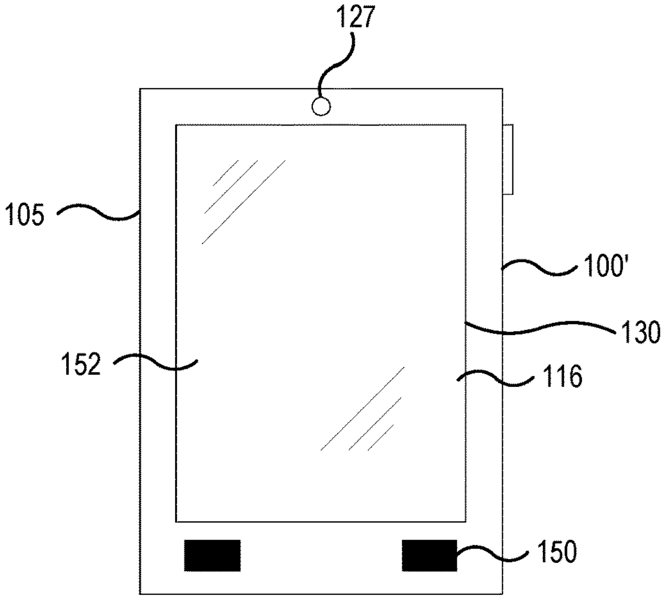

For example, referring to FIG. 2D, a gaming device 100' may be implemented as a handheld device including a compact housing 105 on which is mounted a touchscreen display device 116 including a digitizer 152. As described in greater detail with respect to FIG. 3 below, one or more input devices 130 may be included for providing functionality of for embodiments described herein. A camera 127 may be provided in a front face of the housing 105. The housing 105 may include one or more speakers 150. In the gaming device 100', various input buttons described above, such as the cashout button, gameplay activation button, etc., may be implemented as soft buttons on the touchscreen display device 116 and/or input device 130. In this embodiment, the input device 130 is integrated into the touchscreen display device 116, but it should be understood that the input device may also, or alternatively, be separate from the display device 116. Moreover, the gaming device 100' may omit certain features, such as a bill acceptor, a ticket generator, a coin acceptor or dispenser, a card reader, secondary displays, a bet display, a credit display, etc. Credits can be deposited in or transferred from the gaming device 100' electronically.

Figure 2E:
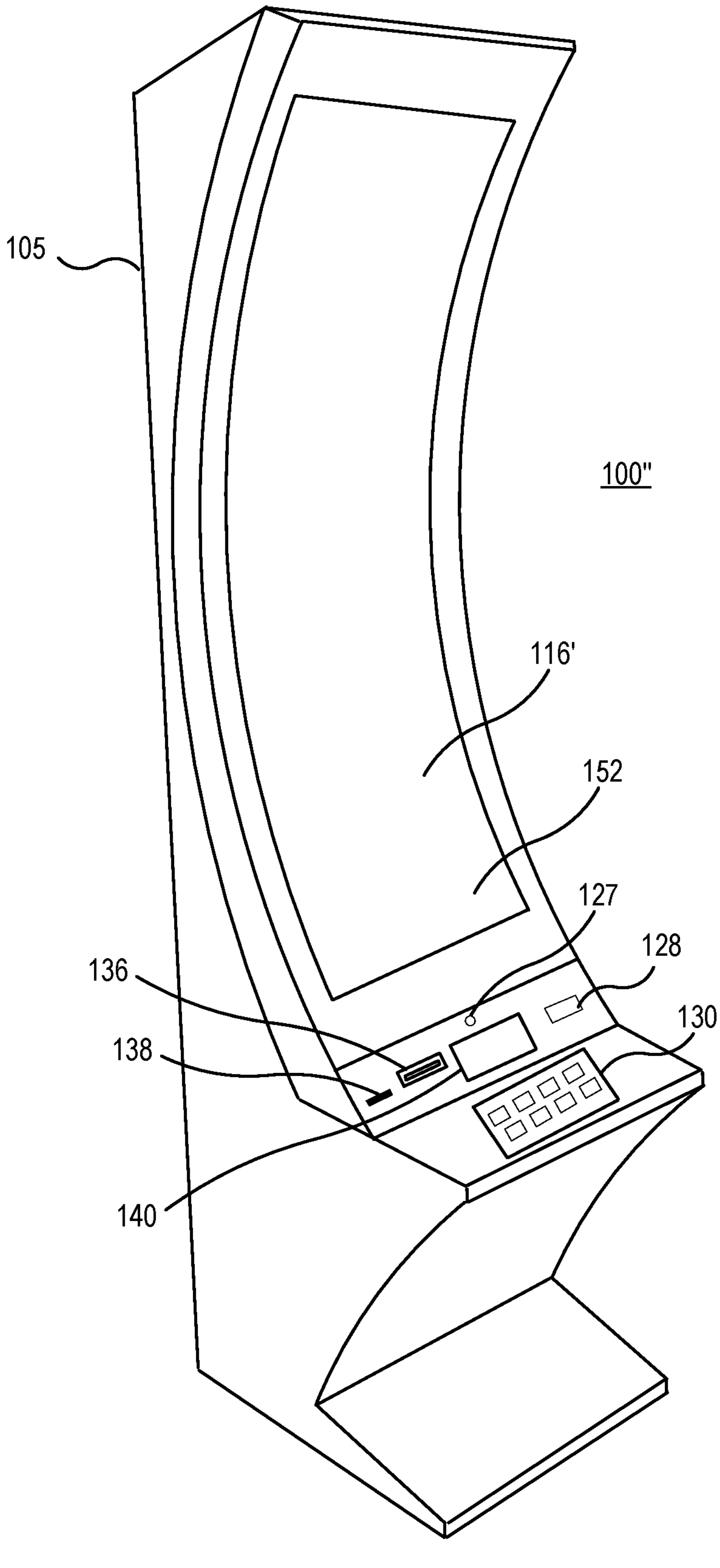

FIG. 2E illustrates a standalone gaming device 100", i.e., an EGM in this example, having a different form factor from the gaming device 100 illustrated in FIG. 2A. In particular, the gaming device 100" is characterized by having a large, high aspect ratio, curved primary display device 116' provided in the housing 105, with no secondary display device. The primary display device 116' may include a digitizer 152 to allow touchscreen interaction with the primary display device 116'. The gaming device 100" may further include a player tracking display 142, an input device 130, a bill/ticket acceptor 128, a card reader 138, and a bill/ticket dispenser 136. The gaming device 100" may further include one or more cameras 127 to enable facial recognition and/or motion tracking.

Although illustrated as certain gaming devices, such as electronic gaming machines (EGMs) and mobile devices, similar functions and/or operations as described herein may include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, gaming devices according to embodiments herein may be implemented using other computing devices and mobile devices, such as smart phones, tablets, and/or personal computers, among others.

Various embodiments herein describe providing an incentive to play an EGM based on an event occurring on a separate EGM. Providing the incentive can attract more players and provide players with a more exciting experience.

Various embodiments herein describe using comps (e.g., Xtra Credit non-cashable rewards, gift points, and/or player tracking points) to fund a progressive award. In some examples, comps (sometimes referred to herein as casino comps) may be earned by non-gaming activities (e.g., spending within a casino environment). In additional or alternative examples, comps may be earned based on gameplay activities in association with one or more plays of a game.

The term player may be used herein to refer to a person participating in any activity that results in a chance to win the progressive award. The activities may include any activity capable of obtaining a comp including wagering/gameplay activities and/or non-wagering/non-gameplay activities. Accordingly, in some examples, a player may refer to a person who is not interacting with an EGM. In additional or alternative examples, a player may refer to a person who has spent money within an environment of the progressive award (e.g., a casino). In additional or alternative examples, the activities include spending money in a restaurant associated with a casino, spending money on a hotel room associated with a casino, spending money on merchandise in a store associated with a casino, spending money on a show associated with a casino. In additional or alternative examples, comps can be obtained based on an amount of money spent playing games in a casino.

In some embodiments, in response to a player earning a quantity of comps (e.g., funded by a gaming establishment marketing program), a system associated with a progressive award contributes some or all of the earned comps to the progressive award. The comps may have traditionally been credited to a player's account. In some examples, the player may indicate that some or all earned comps be added to a progressive instead. Indicating that some or all earned comps be added to the progressive may give the player a chance of winning the progressive award, may cause the progressive to be increased by more than the value of the contributed comps, or may be required in order to earn the comps. If the system contributes less than all of the earned comps to grow the progressive award, the remaining non-contributed comps can be provided to the player in association with their account.

In additional or alternative embodiments, the progressive award may be won in association with the contribution. In some examples, if the contribution of some or all of the earned comps contributed to the progressive award causes a progressive award triggering event to occur (e.g., a lucky point/lucky time triggering event), the player that contributed some or all of their earned comp is provided the progressive award. In additional or alternative examples, the progressive award triggering event includes a lucky point triggering event in which the progressive award is rewarded in response to a value of the progressive award reaching or exceeding a predetermined amount. In additional or alternative examples, the progressive award triggering event includes a lucky time triggering event in which the progressive award is rewarded in response to the progressive award being increased at or after a predetermined time (or during a predetermined time period).

In additional or alternative embodiments, in response to the triggering event occurring, the progressive award is provided to a player selected from a set of players that have contributed to the progressive pool during a period of time (e.g., during a recent rolling period of time or since a progressive award was provided). In some examples, the progressive award is provided to a player randomly selected from the set of players. In additional or alternative examples, the probability of selecting a player from the set of players can be weighted based on one or more factors (e.g., an amount wagered by the player, a time since the player placed the wager, or a status of the player)

In additional or alternative embodiments, the progressive award is in the form of one or more comps. For example, if players each contribute a quantity of player tracking points to the progressive award, the winner of the progressive award can win a second quantity of player tracking points. In some examples, the second quantity of player tracking points can be the total of all tracking points contributed by each of the players. In additional or alternative examples, the second quantity of player tracking points can be the total tracking points contributed by each of the players plus a percentage amount or predetermined amount from a marketing budget.

In additional or alternative embodiments, the progressive award is in the form of a monetary amount (e.g., dollars). In some examples, the system determines a monetary amount for each contributed comp and that monetary amount is allocated to the progressive award. In additional or alternative embodiments, the comp-driven progressive award (e.g., in the form of a monetary amount) is combined with one or more coin-in based progressive awards maintained by the system. In some examples, a progressive award that is funded via multiple sources (e.g., coin-in and forfeited comps) may be won in association with a coin-in activity (e.g., lucky coin) and/or a comp activity (e.g., lucky comp). In additional or alternative examples, the system maintains the comp-driven progressive award and the coin-in based progressive awards separately.

In additional or alternative embodiments, the system automatically reallocates marketing dollars from comps to progressive awards. In some examples, comps are only valid for a predetermined period of time. In additional or alternative examples, a player can indicate a valid comp stored in their player account be used to increase a progressive award. In additional or alternative examples, when a comp expires in a player's account the system can increase a progressive award by a portion of the expired comp.

In additional or alternative embodiments, when a progressive award is increased by a portion of a comp, the progressive award can be increased by a value (e.g., the portion of the comp or a monetary value of the portion of the comp) with an expiration dated based on an expiration date of the contributed comp. For example, a comp with an expiration date of the end of the month and a value of $100 may be contributed to a progressive award such that the progressive award is increased by $100 until the end of the month (or until the progressive award is won, whichever comes first).

In additional or alternative embodiments, the system enables a player to decide whether to participate and if so, a percentage of their comps the player would like to forgo to be contributed to a progressive award.

In additional or alternative embodiments, different forms of comps are associated with different progressive awards. In some examples, comps associated with free gameplay (e.g., free spins or an amount of money for use in slot machines) can be associated with a free gameplay progressive award while comps associated with free nights (e.g., free hotel rooms) can be associated with a free night progressive award. In additional or alternative embodiments, different forms of comps are associated with a common progressive award. In some examples, comps associated with free gameplay and comps associated with a free night are associated with a common progressive award.

In additional or alternative embodiments, the system for managing the comp-based progressive award includes a progressive controller (e.g., central controller 40 in FIG. 1). In additional or alternative embodiments, the system includes one or more EGMs (e.g., EGM 100 in FIG. 1). In additional or alternative embodiments, the system includes a player spend tracker (e.g., player tracking server 45) that determines when a player has earned a comp or performed a qualifying activity.

In some embodiments, systems fund a progressive award based on an amount provided by one or more marketing and/or advertising departments. In additional or alternative embodiments, the system funds the progressive based on an amount of comps earned by a player. In some examples, the amount of comps earned is based on the gaming session undertaken by the player/other comp earning activities undertaken by the player. For example, rather than a marketing department contributing a static amount to a progressive award, the system can contribute a variable amount to the progressive award. The variable amount can be based on activities associated with a gaming session and/or non-gaming session spend. Such a configuration results in the progressive award growing quicker responsive to plays of games and/or casino spend as forfeited marketing dollars (and, in certain instances, a portion of coin-in) contribute to the progressive award.

Figure 3:
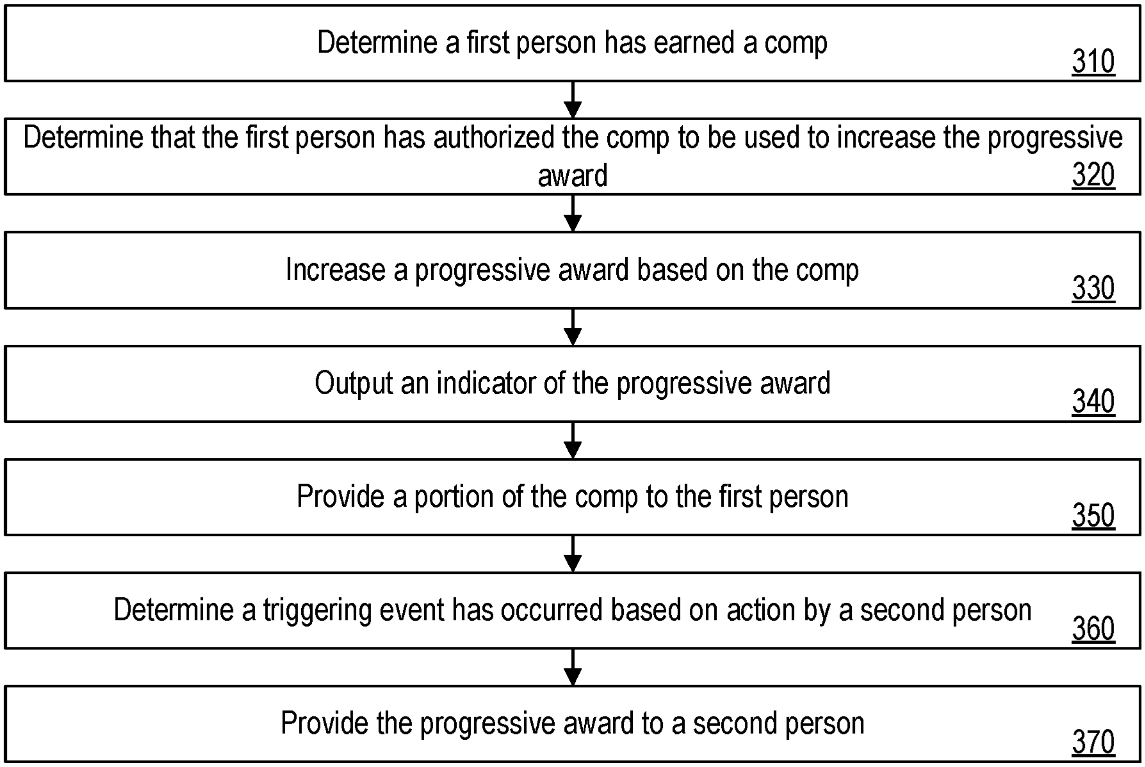
FIG. 3 is a flow chart illustrating examples of operations according to some embodiments.

FIG. 3 illustrates an example of operations for managing a progressive award based on comps. Although the operations are described below as being performed by a progressive controller such as central controller 40, the operations may be performed by any suitable entity (e.g., system 10, player tracking server 45, or EGM 100).

At block 310, processing circuitry 42 determines a first person has earned a comp. In some embodiments, determining that the first person has earned the comp includes determining that gameplay activity by the user exceeds a threshold value. In some examples, the gameplay activity is separate from an amount wagered by the user. For example, the gameplay activity can include a number of games played or an amount of time playing games. In additional or alternative examples, the gameplay activity can be a total amount spent playing the game rather than an individual wager.

In additional or alternative embodiments, determining that the first person has earned a comp includes determining that non-gameplay activity by the first person exceeds a threshold value. In some examples, the first person includes a patron of a casino. Determining that non-gameplay activity by the first person exceeds the threshold value can include determining that the first person has made one or more purchases at one or more businesses associated with the casino that exceed the threshold value. Examples of the one or more businesses can include a restaurant, a store, a show provider, and a hotel.

At block 320, processing circuitry 42 determines that the first person has authorized the comp to be used to increase the progressive award. In some embodiments, the authorization is indicated as part of creating a player account prior to earning the comp. In additional or alternative embodiments, the authorization is provided on a comp-by-comp basis via the player account. In additional or alternative embodiments, a specific game, EGM, set of EGMs, or gaming environment may require the player to contribute a portion of awarded comps to be used to increase the progressive award. In some examples, the specific game, EGM, set of EGMs, or gaming environment includes signs and/or displays stating that playing the specific game, EGM, set of EGMs, or in the gaming environment implicitly authorizes a portion of the awarded comps to be used to increase the progressive award.

At block 330, processing circuitry 42 increases a progressive award based on the comp. In some embodiments, the progressive award is increased in response to the first person earning the comp and the first person authorizing the comp to be used to increase the progressive award. In some examples, the progressive award is increased prior to the comp (or a portion thereof) being transferred to an account associated with the first person. In additional or alternative examples, the progressive award is increased in response to a comp in an account associated with the user expiring (e.g., due to the comp only being valid for a period of time and the period of time elapsing). In additional or alternative examples, the progressive award is increased in response to the first person requesting the comp be converted into an increase in the progressive award (which can offer the first person an opportunity to win the progressive award). In additional or alternative examples, the progressive award is increased in response to the first person using the comp.

In additional or alternative embodiments, increasing the progressive award based on the comp includes increasing a value of the progressive award by a value of a first portion of the comp. In some examples, the comp includes a predetermined percentage or a percentage authorized by the first person.

In additional or alternative embodiments, the progressive award is increased by the portion of the comp plus a bonus amount (e.g., a flat amount or a percentage).

In additional or alternative embodiments, the progressive controller 40 is associated with a casino. The progressive award includes a first portion funded based on comps earned by one or more patrons of the casino and a second portion funded based on wagers by one or more patrons of the casino. In some examples, the first portion of the progressive award is maintained separately from the second portion of the progressive award.

At block 340, processing circuitry 42 outputs, via network interface 46, an indicator of the progressive award. In some embodiments, the progressive award includes one or more comps. Outputting the indicator of the progressive award can include transmitting a message indicating the one or more comps.

In additional or alternative embodiments, the progressive award includes money equal to one or more comps. Outputting the indicator of the progressive award can include displaying an indicator of the money.

In additional or alternative embodiments, outputting the indicator of the progressive award includes transmitting a message to a device providing the progressive award. The message indicating the progressive award and/or a change in the progressive award.

At block 350, processing circuitry 42 provides a portion of the comp to the first person. In some embodiments, the portion of the comp provided to the first person is the amount remaining after adding a portion of the comp to the progressive award.

At block 360, processing circuitry 42 determines a triggering event has occurred based on action by a second person. In some embodiments, the triggering event is associated with an increase to the progressive award. In some examples, the triggering event includes a value of the progressive award reaching and/or exceeding a predetermined threshold value. In additional or alternative examples, the triggering event includes the progressive award being increased at a time equal to or after a predetermined time. In additional or alternative examples, the triggering event includes a current time being equal to or after a predetermined time. In some examples, in response to the current time being equal to or after a predetermined time, the progressive controller can determine a winning player based upon recent (e.g., a rolling period of time prior to the current time) activity by players that resulted in a contribution to the progressive pool. In additional or alternative embodiments, the triggering event is associated with gameplay activity by the second person.

In some examples, the second person is the first person. In additional or alternative examples, the triggering event is the increase to the progressive award in block 330.

At block 370, processing circuitry 42 provides the progressive award to a second person. In some embodiments, providing the progressive award includes dispensing an amount of money equal to at least a portion of the progressive award. In additional or alternative embodiments, providing the progressive award includes transferring the progressive award to an account associated with the second person.

In some embodiments, the progressive award includes: a first portion funded based on comps earned by one or more persons; a second portion funded based on an amount wagered by one or more users; and a third portion funded based on a marketing budget of an operator of a progressive game associated with the progressive award. The first portion of the progressive award is maintained separately from the second portion of the progressive award.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks. The flowchart and block diagrams in the FIGS. illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. An electronic gaming machine ("EGM") comprising:

a processor circuit; and a memory coupled to the processor circuit, the memory comprising machine-readable instructions that, when executed by the processor circuit, cause the EGM to perform operations comprising:

determining that a user has earned a comp based on a first signal received by the processing circuit;

responsive to the comp being earned by the user and prior to the comp being used, increasing a digital version of a progressive award based on the comp; and outputting an indicator of the progressive award by the processing circuit transmitting a second signal.

2. The EGM of claim 1, wherein determining that the user has earned a comp comprises determining that gameplay activity by the user exceeds a threshold value, and wherein the gameplay activity is separate from an amount wagered by the user.

3. The EGM of claim 1, wherein increasing the progressive award based on the comp comprises increasing a value of the progressive award by a value of a first portion of the comp.

4. The EGM of claim 3, the operations further comprising:

providing a value of a second portion of the comp to the user.

5. The EGM of claim 1, the operations further comprising:

determining that a triggering event has occurred based on increasing the progressive award or based on additional gameplay activity by the user; and responsive to determining that the triggering event has occurred, providing the progressive award to the user.

6. The EGM of claim 1, wherein the progressive award comprises one or more comps, and wherein outputting the indicator of the progressive award comprises transmitting a message indicating the one or more comps.

7. The EGM of claim 1, wherein the progressive award comprises money equal to one or more comps, and wherein outputting the indicator of the progressive award comprises displaying an indicator of the money.

8. The EGM of claim 1, wherein the EGM is associated with a casino, wherein the progressive award comprises:

a first portion funded based on comps earned by one or more patrons of the casino; and a second portion funded based on an amount wagered by one or more patrons of the casino, and wherein the first portion of the progressive award is maintained separately from the second portion of the progressive award.

9. A method of operating a progressive controller, the method comprising:

determining that a first person has earned a comp based on a first signal received by a processing circuit of the progressive controller;

responsive to determining that the first person has earned the comp and prior to the comp being used, increasing a digital version of a progressive award based on the comp;

determining that a triggering event has occurred based on an increase to the progressive award or gameplay activity by a second person; and responsive to determining the triggering event has occurred, providing the progressive award to the second person by the processing circuit transmitting a second signal.

10. The method of claim 9, wherein determining that the first person has earned a comp comprises determining that non-gameplay activity by the first person exceeds a threshold value.

11. The method of claim 10, wherein the first person comprises a patron of a casino, wherein determining that non-gameplay activity by the first person exceeds the threshold value comprises determining that the first person has made one or more purchases at one or more businesses associated with the casino that exceed the threshold value.

12. The method of claim 9, wherein the second person is the first person, wherein determining that the triggering event has occurred comprises determining that the triggering event has occurred based on the progressive award exceeding a threshold value in response to increasing the progressive award based on the comp.

13. The method of claim 9, wherein the progressive award comprises one or more comps, and wherein providing the progressive award to the second person comprises transferring the one or more comps to an account associated with the second person.

14. A system comprising:

a processor circuit; and a memory coupled to the processor circuit, the memory comprising machine-readable instructions that, when executed by the processor circuit, cause the processor circuit to perform operations comprising:

determining that a person has earned a comp based on a signal received by the processing circuit;

responsive to the comp being earned by the person and prior to the comp being used, increasing a digital version of a progressive award based on the comp; and responsive to increasing the progressive award, transmitting a message to one or more devices indicating the progressive award.

15. The system of claim 14, wherein determining that the person has earned a comp comprises determining that gameplay activity by the person exceeds a threshold value, and wherein the gameplay activity is separate from an amount wagered by the person.

16. The system of claim 14, wherein determining that the person has earned a comp comprises determining that non-gameplay activity by the person exceeds a threshold value, and wherein the non-gameplay activity comprises an amount spent on purchases at a business associated with the system.

17. The system of claim 14, wherein increasing the progressive award based on the comp comprises increasing a value of the progressive award by a value of a first portion of the comp.

18. The system of claim 14, the operations further comprising:

determining that the person has authorized the comp be used to increase the progressive award, wherein increasing the progressive award based on the comp comprises increasing the progressive award in response to determining that the person has authorized the comp to be used to increase the progressive award.

19. The system of claim 14, wherein the person comprises a first person, the operations further comprising:

determining that a triggering event has occurred based on increasing the progressive award or on gameplay activity by a second person, wherein transmitting the message comprises transmitting the message comprising instructions to transfer the progressive award to an account associated with the second person.

20. The system of claim 14, wherein the progressive award comprises:

a first portion funded based on comps earned by one or more persons;

a second portion funded based on an amount wagered by one or more users; and a third portion funded based on a marketing budget of an operator of a progressive game associated with the progressive award, and wherein the first portion of the progressive award is maintained separately from the second portion of the progressive award.

* * * * *